United States Patent [19]

Leuenberger

[11] Patent Number: 4,656,478

[45] Date of Patent: Apr. 7, 1987

[54] PASSIVE TRANSPONDER FOR LOCATING AVALANCHE VICTIMS

[75] Inventor: Claude-Eric Leuenberger, Chézard, Switzerland

[73] Assignee: Asulab S.A., Bienne, Switzerland

[21] Appl. No.: 757,990

[22] Filed: Jul. 23, 1985

[30] Foreign Application Priority Data

Jul. 30, 1984 [CH] Switzerland ............... 3693/84

[51] Int. Cl.⁴ .................................. G01S 13/80
[52] U.S. Cl. ............................ 342/51; 342/22; 342/193
[58] Field of Search ........... 343/6.8 R, 6.5 R, 5 NA; 342/51, 193

[56] References Cited

U.S. PATENT DOCUMENTS 3,373,425  3/1968  Barischoff ............... 342/187
4,314,373  2/1982  Sellers ..................... 342/51 X
4,331,957  5/1982  Enander et al. ......... 342/51 X

FOREIGN PATENT DOCUMENTS 2352807  4/1975  Fed. Rep. of Germany ... 343/6.5 R
2437464  2/1976  Fed. Rep. of Germany ........ 342/22

Primary Examiner—T. H. Tubbesing
Attorney, Agent, or Firm—Sughrue, Mion, Zinn, Macpeak and Seas

[57] ABSTRACT

This transponder includes a dielectric support, an antenna and a covering layer. The central portion of the antenna forms a self induction loop which, together with the junction capacity of a non-linear component serving to close the loop, provides a circuit resonating at the frequency at which the transponder receives its energy. The antenna radiates energy at double this frequency which energy may be detected by a receiver.

21 Claims, 13 Drawing Figures

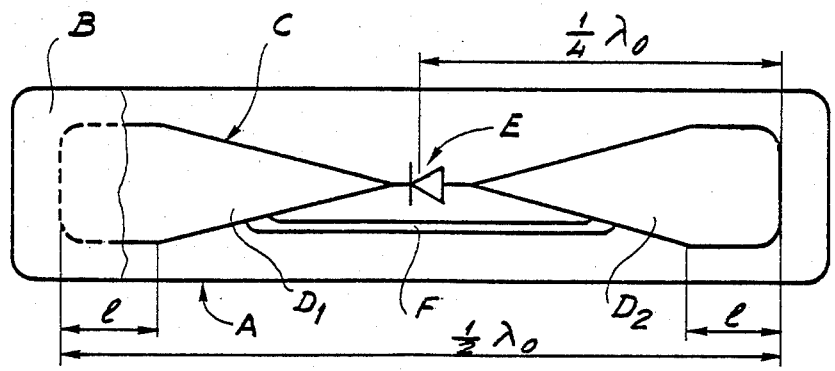
PRIOR ART Fig. 1
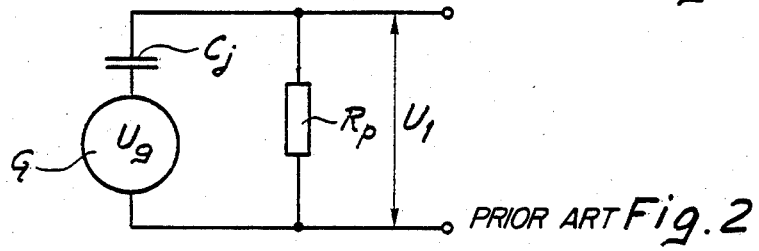
PRIOR ART Fig. 2
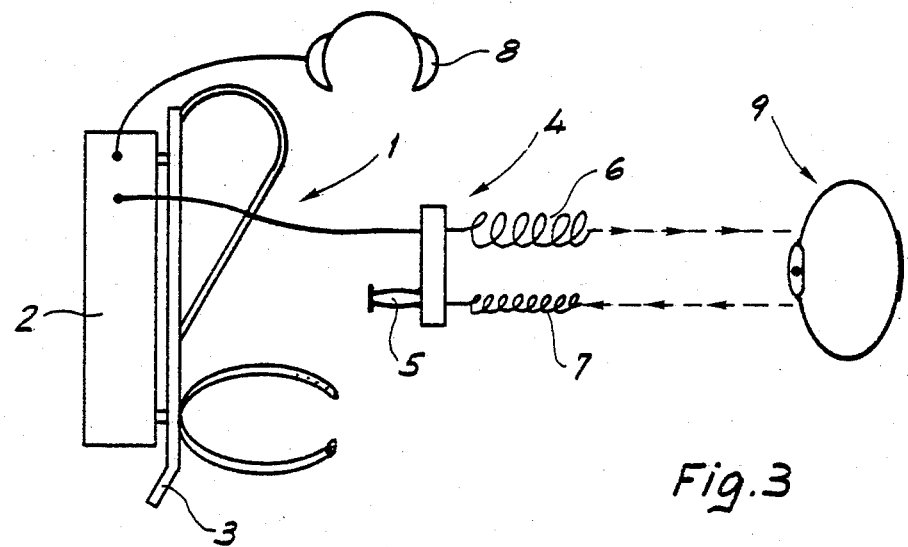
Fig. 3

PASSIVE TRANSPONDER FOR LOCATING AVALANCHE VICTIMS

BACKGROUND OF THE INVENTION

This invention concerns a system for detecting at a distance persons or objects by means of ultra high frequency energy. In particular the invention concerns such a system intended to seek out avalanche victims.

From U.S. Pat. No. 4,331,957 it is known to fashion a system of the type indicated above by means of a passive transponder element intended to be carried by a person and a combined transmitter-receiver transmitting at a given ultra-high frequency $f_o$ and tuned to a reception frequency $2f_o$, the energy radiated by the transmitter being partially returned by the transponder with a frequency double that of the transmitting frequency. In such a system it is naturally convenient to reject in the emission spectrum of the transmitter the component $2f_o$ which explains the utilization of the band of ultra-high frequencies in which such a rejection belongs completely to the domain of the possible. In practice one may thus employ for the frequency $f_o$ a value on the order of Gigahertz.

The transponder described in the previously mentioned patent is obtained in conformity with FIG. 1 of the attached drawings. A plate A in dielectric material is covered over its entire surface by a protective leaf B and between this plate and the leaf there is sandwiched an antenna C. The latter is realized by means of a metallic leaf and exhibits two radiating elements $D_1$ and $D_2$ connected together by a non-linear passive component E, more particularly a diode having a quadratic current-voltage characteristic. Moreover, the two radiating elements are further connected by a conductor F. It will be likewise noted that each radiating element $D_1$ and $D_2$ is narrowed from an end zone of length l to form on the opposite end a connection point to the diode.

There is shown on FIG. 2 the equivalent schematic of the transponder of FIG. 1. In order that the antenna may capture a maximum of energy at frequency $f_o$, it is preferable to give it at least approximately a length $\frac{1}{2} \lambda_o$, which is the half wave length of the frequency which it receives from the transmitter. Furthermore, each radiating element $D_1$ and $D_2$ has a length $\frac{1}{4} \lambda_o$ in order to be able to emit at the frequency $2f_o$ at which the energy captured by the antenna is retransmitted thanks to diode E. From here one may assimilate the antenna in its energy reception configuration to a generator G producing a voltage $U_g$ at frequency $f_o$ and giving it out via a capacity $C_j$, which is that of the diode E in a utilizing circuit formed by radiating element $D_1$ and $D_2$, with a certain loss in energy which is symbolized here by resistance $R_p$. The circuit output voltage $U_1$ will thus be lower than that of the generator G.

In order to obtain a better yield of the transformation of the energy at frequency $f_o$ to energy at frequency $2f_o$, the U.S. patent previously mentioned provides coupling together the two radiating elements by conductor F. The latter constitutes a conductive path for the direct current and brings about a certain bias of diode E which may then be employed with an operating point situated at a higher level in its current-voltage characteristic.

To give a concrete idea of the arrangement it is useful to note that the length of the antenna may be about 125 mm, its width being 22 mm, for instance, these dimensions being necessary to obtain with a certain power of transmission from the search apparatus a reflection of energy detectable by the receiver thereof and capable of being exploited for the seeking out of persons.

This invention has as purpose to provide a transponder conceived according to the principle which has just been described but which either generates a retransmission of power at a higher level for dimensions comparable to that of the transponder of the prior art, or produces with smaller dimensions a retransmission power comparable to that generated by the prior art transponder.

SUMMARY OF THE INVENTION

The invention thus provides a passive transponder for seeking out persons by means of a combined transmitter-receiver capable of transmitting at a first frequency and receiving at a second frequency which is a harmonic of said first frequency comprising a dielectric support to which is fixed an antenna formed from a thin conductive sheet and which includes a non-linear passive component as well as a conductive portion electrically parallel to such component in order to assure a direct current bias thereof. The antenna provides a cutout portion, the edge of which defines a conductive path closed by the passive component so as to form a self induction loop which together with the capacity of the component provides a circuit resonating at the first frequency.

There results from these characteristics that the transformation by the antenna of the energy received by the transponder at the frequency $f_o$ into energy available for the retransmission by the transponder at a harmonic of frequency $f_o$ is realized with a better yield since the couple self-induction—internal capacity of the component brings about an increase of the voltage at which the transformation is produced by the quality factor of the resonating circuit. This has as effect that the non-linear component operates at a more favourable point of its current-voltage characteristic.

BRIEF DESCRIPTION OF THE DRAWINGS

FIG. 1 shows schematically a transponder of the prior art;

FIG. 2 is the electrically equivalent circuit of this transponder;

FIG. 3 shows schematically a system for seeking out persons employing a transponder according to the invention;

DESCRIPTION OF THE PREFERRED EMBODIMENTS

Figure 4A:
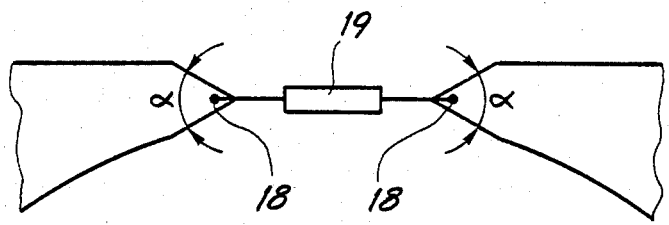
FIG. 4A shows to a larger scale the details of the transponder of FIG. 4 surrounded by the dot-dashed line 0.

Initially reference will be made to FIG. 3 on which appears the functional shematic of a system for seeking out persons employing the transponders according to the invention.

This system comprises an assembly 1 of a transmitter-receiver in a housing 2 which in this example is realized in the form of a portable case. The case is fixed to a harness 3 arranged to be attached to the back of a person charged with the search. The case 2 which contains an energy source as well as all the transmitter and receiver circuits necessary (known from the prior art) is coupled to a set of antennas 4 which the person may manipulate by means of a handle 5. This set comprises a transmitting antenna 6 tuned to the frequency $f_o$ as well as a receiving antenna 7 tuned to the frequency $2f_o$. The transmitter-receiver set likewise comprises an acoustic transducer such as a head phone 8 by means of which the person responsible for the search may determine acoustically when a response is received on antenna 7. In the example shown it is supposed that the transmitter-receiver set 1 is intended to cooperate with transponders 9 according to the invention borne by persons who in moving about for instance in high mountains run the risk of avalanches. In the example of FIG. 3, the transponders are intended to be incorporated in wrist watches in a manner which will be explained further on.

Figure 4:
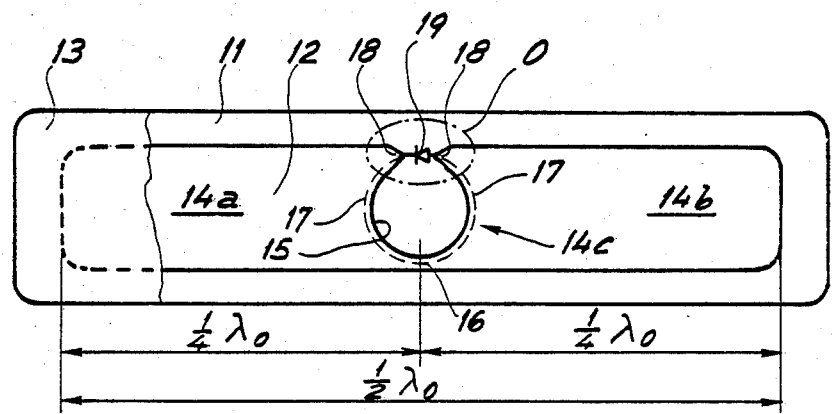
FIG. 4 shows a schematic view of a transponder according to the invention.

There has been shown in FIGS. 4 and 4A a first form of transponder according to the invention. The latter comprises a layer 11 formed of dielectric material, rigid or flexible, to which is applied, for example by gluing or other means, a thin sheet of metal 12 which comprises the antenna of the transponder. The latter is covered over by a protection sheet 13 electrically neutral and fastened for instance by gluing onto the base layer 11.

Antenna 12 itself includes essentially three portions, in particular two radiating elements 14a and 14b extending in prolongation of one from the other and on either side of a central portion 14c. The latter exhibits a cutout 15 preferably of circular form and located symmetrically in the center of the antenna assembly 12. The cutout 15 in the central part 14c bounds initially a current passage 16 situated on one of the sides of the antenna proximate edges 17 which follow the periphery of the cutout 15 and finally two pointed portions 18 (note in particular FIG. 4a) serving for the connection of a diode 19 which in the example shown constitutes the non-linear component of the transponder.

Although the form of the cutout 15 is not critical in respect of the transformation yield of antenna 12, it has appeared that the circular form is very satisfactory since any discontinuity in this form brings about a disturbance of such yield. It is to be noted at the same time that other forms of cutouts appear possible and in particular in the form of a keyhole, a triangular form with linear sides, etc. Furthermore, it has been determined that the yield may be improved if the connecting points of the diode 19 are pointed as shown at 18 on FIG. 4A, the angle α of each point being chosen preferably to be 60°. The non-linear component is preferably comprised of a Schottky diode intended for the detection of signals in the frequency range on the order of Gigahertz, that manufactured by Hewlett-Packard under No. 5 082-2835 appearing to be the most appropriate. The current-voltage characteristic of this diode is virtually quadratic.

Figure 5:
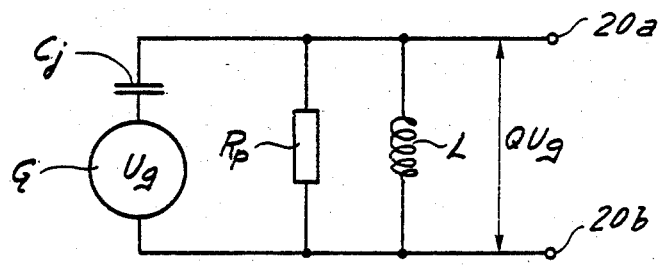
FIG. 5 is an electric circuit equivalent of the transponder of FIG. 4.

There will now be examined the operation of the antenna of FIG. 4 referring at the same time to FIG. 5 which is the supposed equivalent electrical schematic. Effectively it is believed that the improvement of the transformation yield of antenna 12 is brought about by the creation in the antenna of a self-inductance which is located in the portion 14c and which is limited by cutout 15. This special configuration constitutes a current path closed by diode 19 and consisting of the constriction 16, edges 17 and points 18 which form a loop of one turn presenting a certain impedance to the operating frequency of antenna 2. Consequently as shown on FIG. 5, it may be supposed that a frequency $f_o$ the antenna constitutes a generator G providing a voltage $U_g$ connected in series with the junction capacity $C_j$ of diode 19, the assembly being connected in parallel with an absorption resistance $R_p$ and a self-inductance L.

The equivalent circuit of FIG. 5 constitutes thus a resonant circuit tuned to frequency $f_o$ in a manner such that the voltage at terminals 20a and 20b of the circuit is equal to the voltage $U_g$ of the generator multiplied by the quality factor Q. Theoretical calculations show that this factor may be on the order of 3 or 4 or more according to the form of the cut-out 15.

Figure 6:
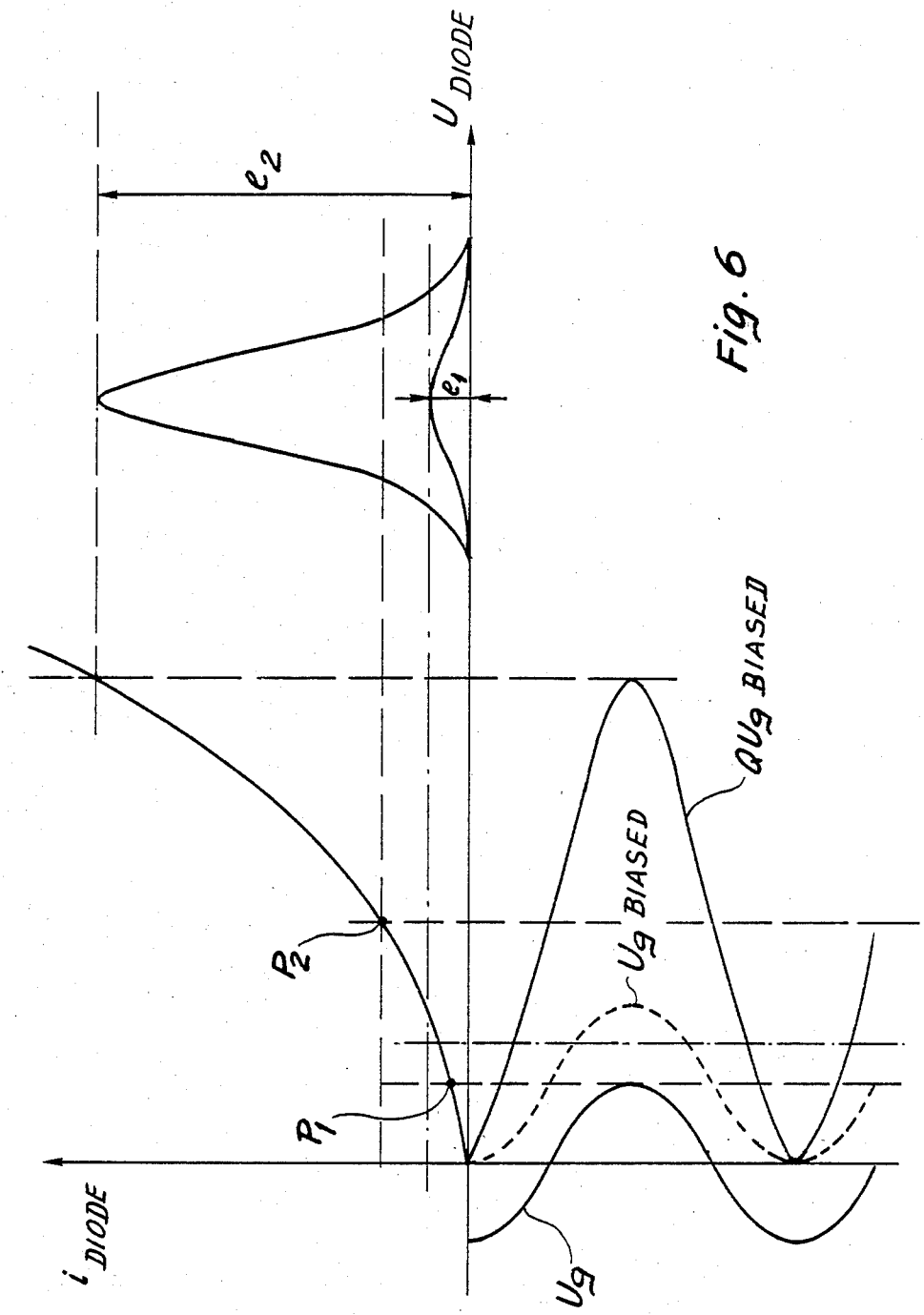
FIG. 6 is a diagram giving comparison between the relative operation of the transponders of FIGS. 1 and 4.

FIG. 6 shows how the operating point of the nonlinear component may be displaced on its characteristic thanks to the combined effect of the direct current bias and of the increase in the output voltage of the circuit of FIG. 5.

While the antenna of the prior art enables the obtaining of an operating point $P_1$ giving rise to a maximum excursion e1 of the output current of the assembly, the provision in the antenna of a self-induction L enables displacing the operating point $P_1$ towards a point $P_2$ situated higher on the characteristic of the diode, the maximum excursion of output current being then equal to e2.

There results therefrom a marked improvement in yield over the prior art of the transformation of energy received by the antenna 12 into retransmitted energy since a clearly greater part of the energy is rendered available to be given off by the radiating elements 14a and 14b and to be broadcast towards the receiving antenna 7 (FIG. 3) of the transmitter-receiver assembly 1.

In the version of FIG. 4 there has been chosen for the length of antenna 12 a value which corresponds approximately to the half-wave length $\lambda_o$ of the broadcast frequency while radiating elements 14a and 14b have each a length approximately equal to $\frac{1}{4}\lambda_o$ so as to be tuned to frequency $2f_o$. It is well understood that the choice of these dimensions definitely imposes limitations in the dimensioning of the transponder should one seek to capture maximum energy on the receiving antenna 7 from a predetermined energy emitted by the transmitter-receiver 1.

In other words, with the same search apparatus (broadcast power and sensitivity of reception equal), the probability with which a transponder according to the invention will be found under the snow will be clearly greater than with the transponders of the type of FIG. 1. However, thanks to the increase of yield brought about by the invention, the probability of detection remains completely satisfactory even if the transponder is not tuned to the frequencies $f_o$ and $2f_o$. This is the same as saying that at the price of a lower retransmitted energy which nevertheless remains sufficient, the dimensions of the transponder may be reduced.

Figures 7, 7A:
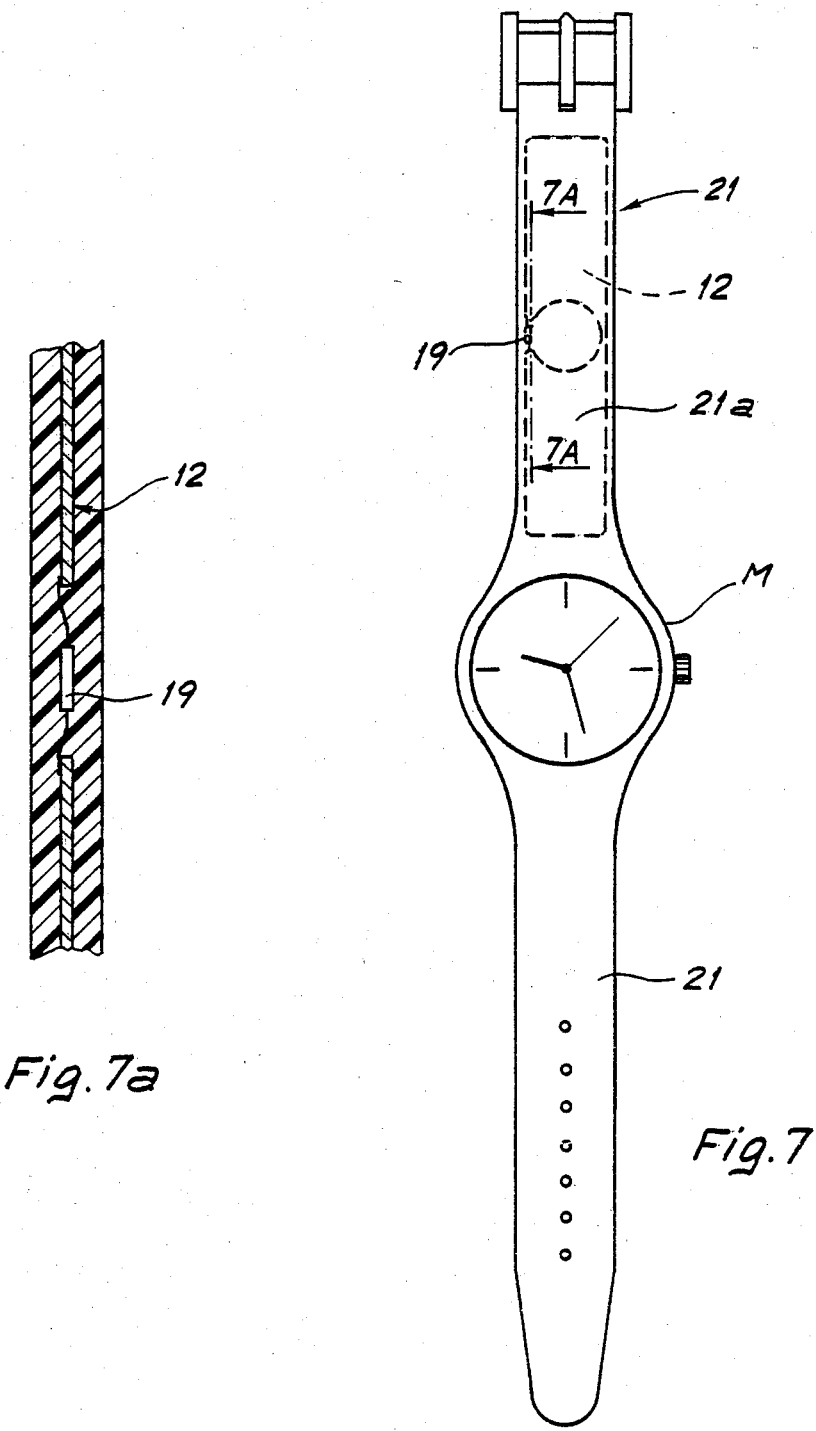
FIG. 7 shows a watch the bracelet of which is provided with a transponder of the type shown in FIG. 4.
FIG. 7A is a part longitudinal cross-section of the bracelet of FIG. 7.

Thus it becomes possible to adapt it to relatively small objects capable of being worn by persons and in particular to wrist watches. The invention foresees thus the association of the transponder with such objects, several methods of realizing the same being shown on FIGS. 7 to 10. FIGS. 7 and 7A show a watch M provided with a bracelet 21 in one of the branches 21a of which is incorporated an antenna 12 of the form shown on FIG. 4, the bracelet constituting in this case the dielectric support of the transponder.

As is well understood, the bracelet may be realized in any appropriate material which provides a certain dielectric constant but preferably if of plastic material the antenna 12 may be incorporated therein at the time of moulding of the bracelet which results in a particularly low manufacturing cost. It will be noted that the antenna 12 is not connected to any energy source and does not cause any inconvenience to the user of the watch M.

Figures 8, 8A:
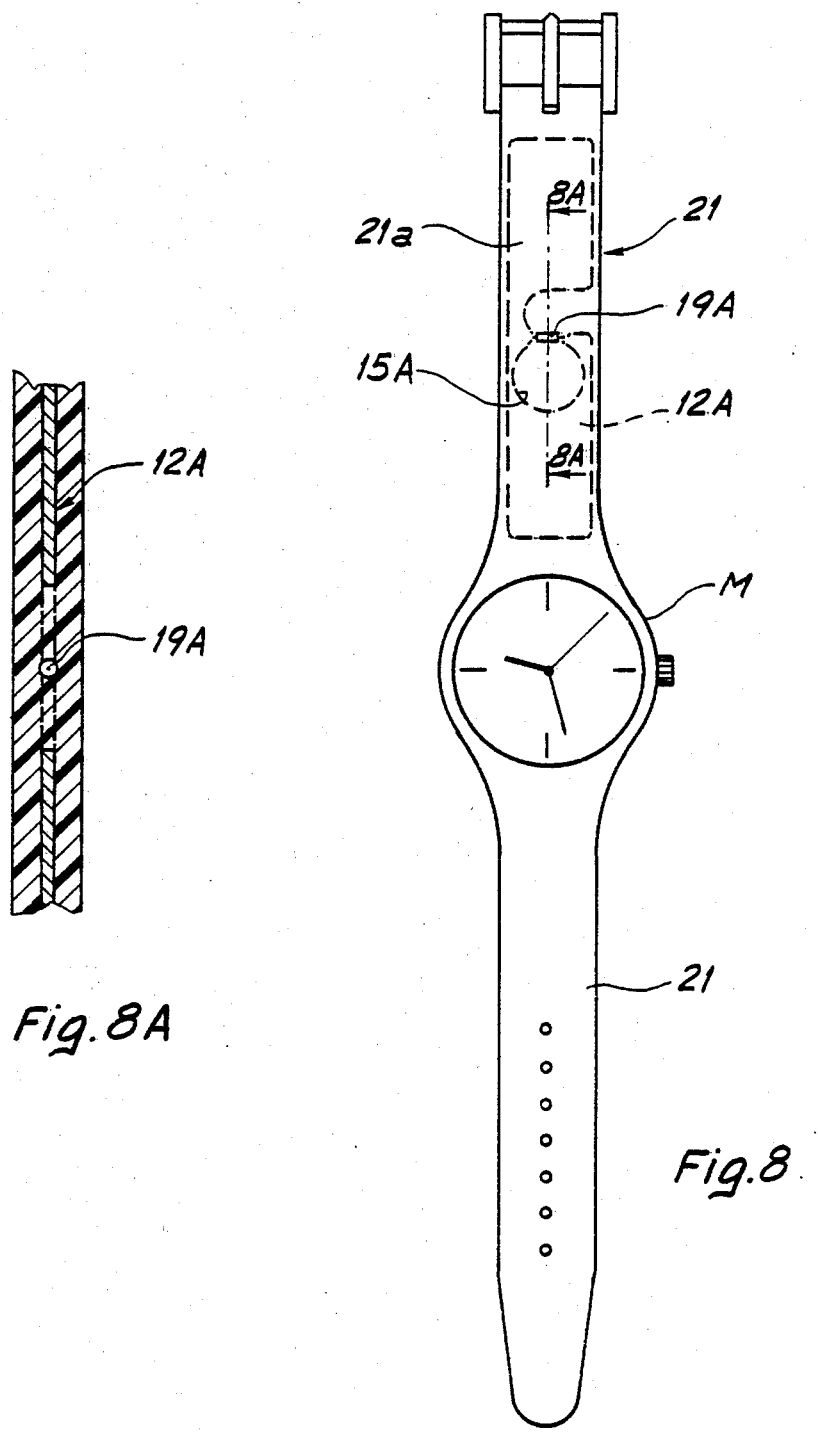
FIG. 8 shows a watch the bracelet of which is provided with a transponder conceived according to another form of the invention.
FIG. 8A is a part longitudinal section of bracelet shown in FIG. 8.

FIGS. 8 and 8A show a variant in the version of FIGS. 7 and 7A in that diode 19A instead of being longitudinally placed in branch 21a of the bracelet, is transversally placed, the cutout 15A being slightly displaced relative to the transverse median plane of antenna 12A. It has appeared that on an electrical basis this displacement has little influence on the transformation yield and that this solution is particularly satisfactory since, diode 19A being placed transversally in portion 21a, the latter may perfectly follow the form of the wrist of the user. In this case also the antenna assembly 12A is advantageously incorporated in branch 21a during the moulding thereof.

Figure 9:
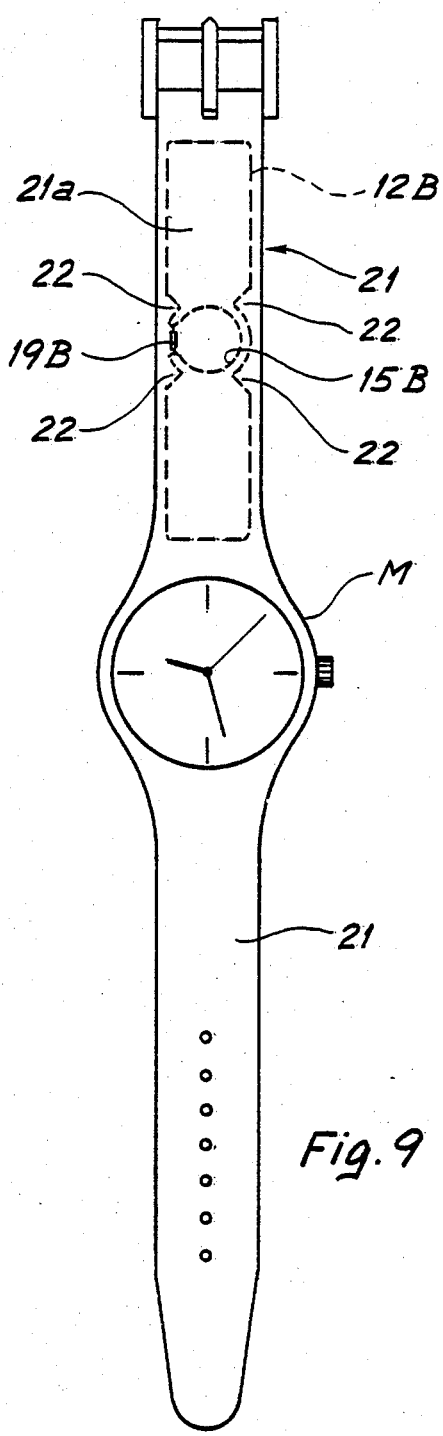
FIGS. 9 and 10 are showings of other modes of realization of the invention.

FIG. 9 shows a further variant in which antenna 12B, while presenting the same form as the antennas previously described, includes notches 22 on both sides of the central portion constituting principally the self-induction, which enable better to limit and localize the path of the direct current about the cut-out 15B which here also is closed by diode 19B.

It has appeared that the probability of detection remains satisfactory even if the scope of the radiating elements is reduced to zero by increasing either the power emitted by antenna 6 (FIG. 3) of the transmitter-receiver assembly 1, or the sensibility of reception of this assembly.

Figure 10:
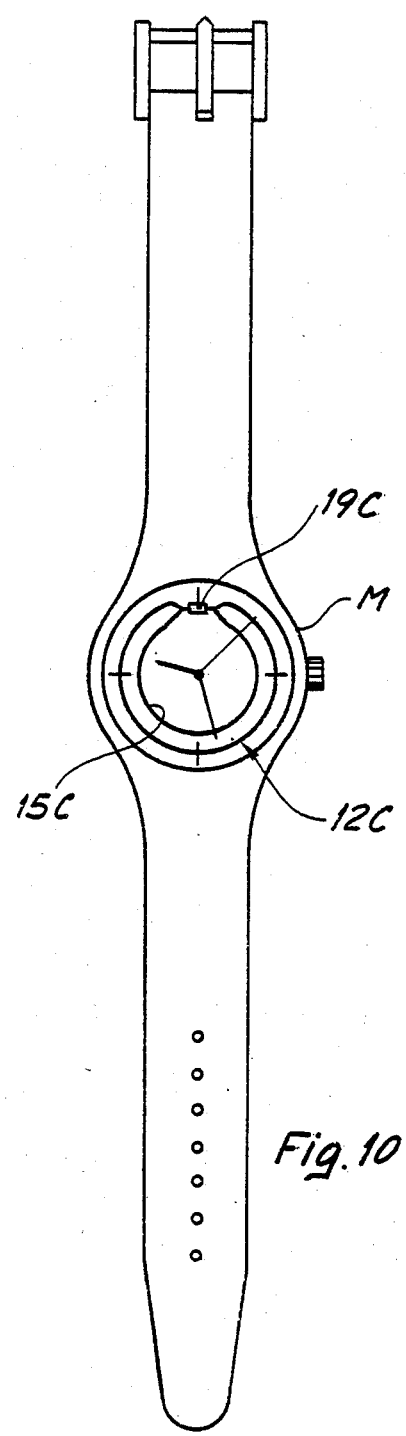

FIG. 10 shows thus a variant of the transponder in which the latter is housed in the interior of the watchcase M, the antenna being reduced in this case to a simple loop 12C the interior opening thereof constituting the cutout 15C and which is closed by diode 19C. This antenna may be fixed by way of example on the dial of watch M, such dial thus constituting the dielectric support of of the transponder.

Finally, the transponder of the invention is not intended to be used only for seeking out avalanche victims. Thus, it may also be employed for locating persons or objects in water or under building rubble for instance. Thus it is possible to attach one or several transponders according to the invention to a windsurfer, a lifebuoy, jacket or similar arrangement in order to permit the localization of persons needing help in the water.

What I claim:

1. A passive transponder for seeking out persons by means of a combined transmitter-receiver capable of transmitting at a first frequency and receiving at a second frequency which is a harmonic of said first frequency, comprising: a dielectric support (11), an antenna formed from a thin conductive sheet (12) fixed to said support and including a non-linear passive component (19) and a conductive portion (16) electrically parallel to said passive component to establish a direct current bias thereof, said antenna sheet defining a cutout portion (15) having an edge (17) which defines a conductive path closed by the passive component to form a self-inductive loop, said loop, together with the capacity of the passive component, providing a circuit resonating at said first frequency, wherein the antenna sheet is linearly elongate, and the cutout portion is disposed proximate a central portion of said elongate antenna sheet intermediate opposite ends thereof.

2. A passive transponder as set forth in claim 1 in which said antenna comprises radiating elements (14a, b) extending from both sides of said self-inductive loop and formed from the same thin sheet.

3. A passive transponder as set forth in claim 2 wherein the distance over which the radiating elements extend from said self-inductive loop is substantially equal to or less than a quarter of the wave length of said first frequency.

4. A passive transponder as set forth in claim 1 in which point shaped portions (18) are provided at the connection points of said non-linear component with said self inductive loop.

5. A passive transponder for seeking out persons by means of a combined transmitter-receiver capable of transmitting at a first frequency and receiving at a second frequency which is a harmonic of said first frequency, comprising: a dielectric support (11), an antenna formed from a thin conductive sheet (12) fixed to said support and including a non-linear passive component (19) and a conductive portion (16) electrically parallel to said passive component to establish a direct current bias thereof, said antenna sheet defining a cutout portion (15) having an edge (17) which defines a conductive path closed by the passive component to form a self-inductive loop, said loop, together with the capacity of the passive component, providing a circuit resonating at said first frequency, wherein the dielectric support comprises a watch bracelet (21).

6. A passive transponder as set forth in claim 5 wherein the antenna is moulded into said bracelet.

7. A passive transponder as set forth in claim 1 wherein the non-linear component is oriented across the bracelet.

8. A passive transponder as set forth in claim 5 in which said antenna comprises radiating elements (14a, b) extending from both sides of said self-inductive loop and formed from the same thin sheet.

9. A passive transponder as set forth in claim 8 wherein the distance over which the radiating elements extend from said self-inductive loop is substantially equal to or less than a quarter of the wave length of said first frequency.

10. A passive transponder as set forth in claim 5 in which point shaped portions (18) are provided at the connection points of said non-linear component with said self-inductive loop.

11. A passive transponder for seeking out persons by means of a combined transmitter-receiver capable of transmitting at a first frequency and receiving at a second frequency which is a harmonic of said first frequency, comprising: a dielectric support (11), an antenna formed from a thin conductive sheet (12) fixed to said support and including a non-linear passive component (19) and a conductive portion (16) electrically parallel to said passive component to establish a direct current bias thereof, said antenna sheet defining a cutout portion (15) having an edge (17) which defines a conductive path closed by the passive component to form a self-inductive loop, said loop, together with the capacity of the passive component, providing a circuit resonating at said first frequency, wherein the dielectric support comprises a watch dial.

12. A passive transponder as set forth in claim 11 in which said antenna comprises radiating elements (14a, b) extending from both sides of said self-inductive loop and formed from the same thin sheet.

13. A passive transponder as set forth in claim 12 wherein the distance over which the radiating elements extend from said self-inductive loop is substantially equal to or less than a quarter of the wave length of said first frequency.

14. A passive transponder as set forth in claim 11 in which point shaped portions (18) are provided at the connection points of said non-linear component with said self-inductive loop.

15. A passive transponder for seeking out persons by means of a combined transmitter-receiver capable of transmitting at a first frequency and receiving at a second frequency which is a harmonic of said first frequency, comprising: a dielectric support (11), an antenna formed from a thin conductive sheet (12) fixed to said support and including a non-linear passive component (19) and a conductive portion (16) electrically parallel to said passive component to establish a direct current bias thereof, said antenna sheet defining a cutout portion (15) having an edge (17) which defines a conductive path closed by the passive component to form a self-inductive loop, said loop, together with the capacity of the passive component, providing a circuit resonating at said first frequency, wherein said antenna comprises radiating elements (14a, b) extending from both sides of said self-inductive loop and formed from the same thin sheet, and wherein notches (22) are provided at junctions between the self-inductive loop and said radiating elements to partially limit an outer contour of said loop.

16. A passive transponder as set forth in claim 15 wherein the distance over which the radiating elements extend from said self-inductive loop is substantially equal to or less than a quarter of the wave length of said first frequency.

17. A passive transponder as set forth in claim 15 in which point shaped portions (18) are provided at the connection points of said non-linear component with said self-inductive loop.

18. A passive transponder for seeking out persons by means of a combined transmitter-receiver capable of transmitting a signal at a first discrete frequency and receiving a return signal at a second discrete frequency which is a harmonic of said first frequency, comprising: exclusively, a dielectric support (11), and an antenna formed from a thin conductive sheet (12) fixed to said support and including a non-linear passive component (19) and a conductive portion (16) electrically parallel to said passive component to establish a direct current bias thereof, said antenna sheet defining a cutout portion (15) having an edge (17) which defines a conductive path including said conductive portion and closed by the passive component to form a self-inductive loop, said loop, together with the capacity of the passive component, providing a circuit resonating exclusively at said first frequency and radiating a return signal exclusively at said second, harmonic frequency.

19. A passive transponder as set forth in claim 18 in which said antenna comprises radiating elements (14a, b) extending from both sides of said self-inductive loop and formed from the same thin sheet.

20. A passive transponder as set forth in claim 19 wherein the distance over which the radiating elements extend from said self-inductive loop is substantially equal to or less than a quarter of the wave length of said first frequency.

21. A passive transponder as set forth in claim 18 in which point shaped portions (18) are provided at the connection points of said non-linear component with said self-inductive loop.

* * * * *